UNITED STATES PATENT OFFICE.

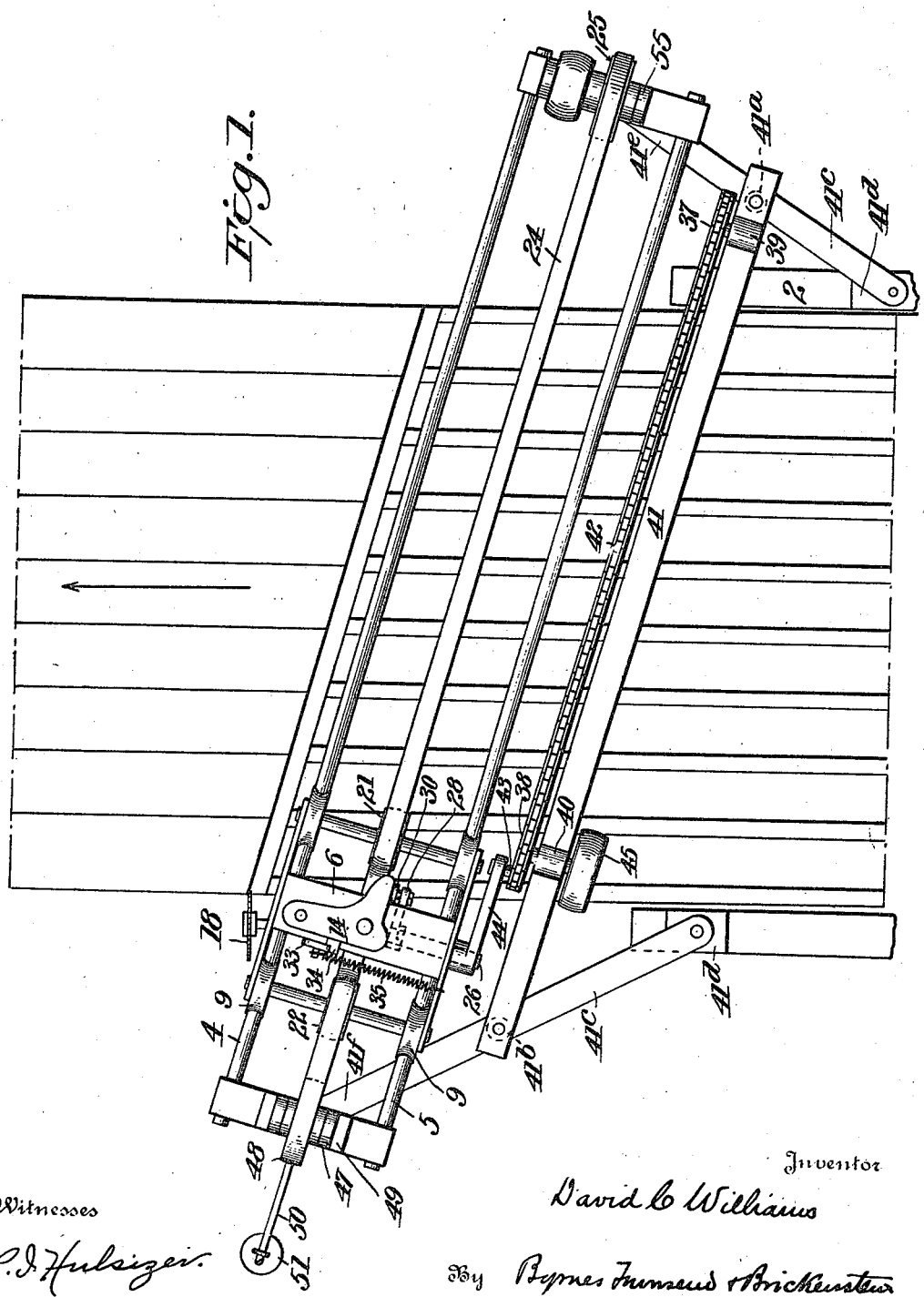

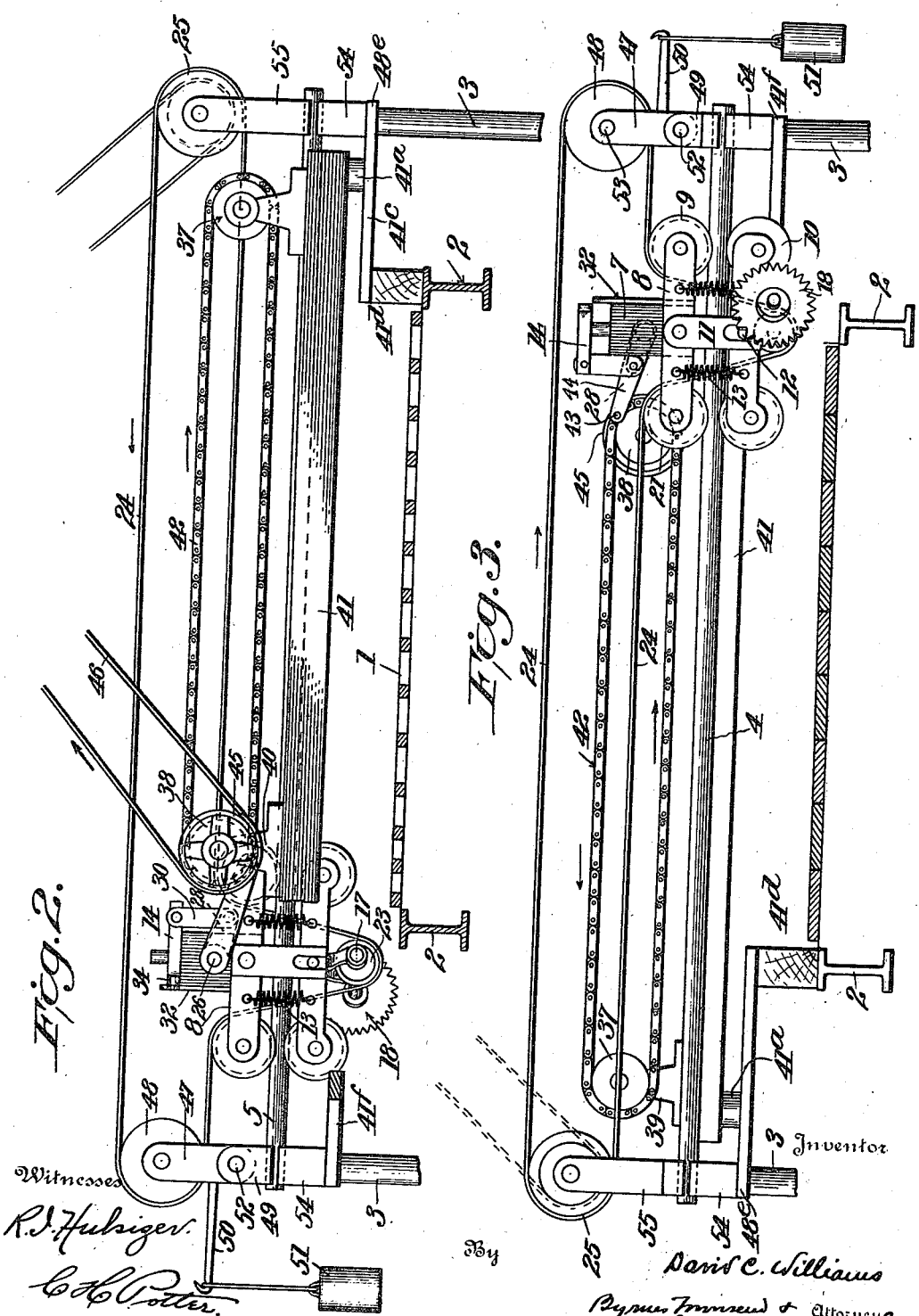

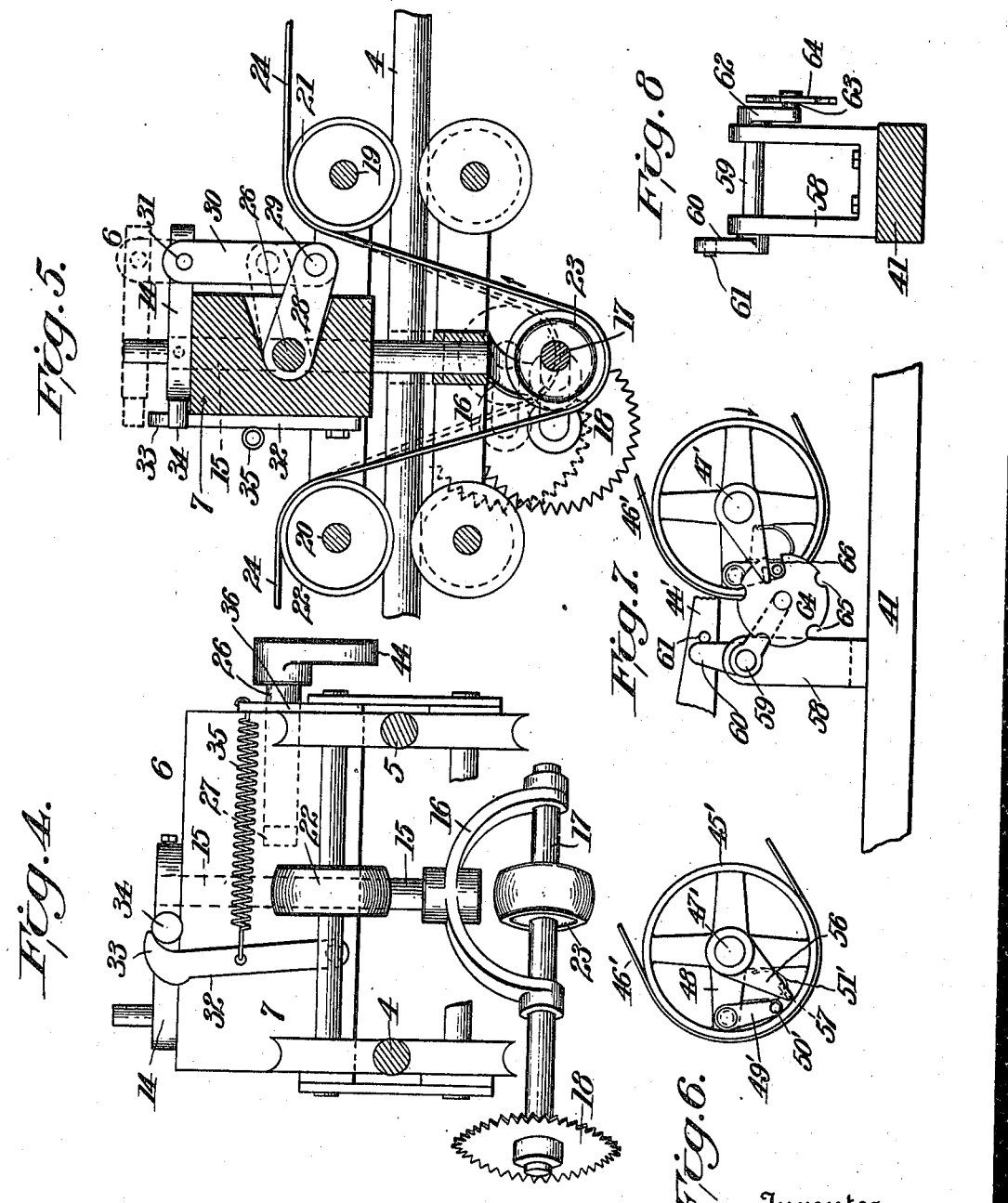

DAVID C. WILLIAMS, OF NORTH HOLSTON, VIRGINIA, ASSIGNOR TO SOUTHERN GYPSUM COMPANY, INCORPORATED, OF NORTH HOLSTON, VIRGINIA, A CORPORATION OF VIRGINIA.

CUT-OFF SAWING-MACHINE FOR PLASTER-BOARDS.

1,147,289.  Specification of Letters Patent.  Patented July 20, 1915.

Application filed July 7, 1914. Serial No. 849,560.

*To all whom it may concern:*

Be it known that I, DAVID C. WILLIAMS, a citizen of the United States, residing at North Holston, in the county of Smyth and State of Virginia, have invented certain new and useful Improvements in Cut-Off Sawing-Machines for Plaster-Boards, of which the following is a specification.

This invention relates to saw-off machines, and particularly to that type of devices especially adapted for severing uniform lengths from a continuously-moving web of material.

More particularly the invention relates to such machines as are used for sawing off plaster-boards.

Heretofore, two types of saw-off machines have been used in severing plaster-boards from the continuous web of plastic-material. In one of these, the web is interrupted during the severing, as by a transversely-moving saw, or a knife or the like; while in the machines of the other type, the saw- or cutter-carriage is moved forward, that is, in the direction of the line of movement of the plaster-board sheet, with the same speed at which the latter is traveling, while the cutter is moving, in the meantime, transversely of the bed or web and severing a plaster-board. The whole carriage is then returned, as by a spring, to its initial position in order to start a new cut.

The object of the present invention is to provide a machine which will avoid the necessity of the objectionable interruption of the movement of the plaster-board web, as in machines of the first type, while performing the cut-off operation, and to eliminate the frequent repairs and large expense incidental to the use of machines of the second type.

According to this invention, the saw-carriage is caused to move along stationary ways so disposed across the bed of the machine as to cause the saw to travel forward, *i. e.* in the direction of travel of the web with the same speed as the latter, and yet at the same time move across the web so as to make a cut at right-angles to the line of travel of the continuously-moving web of plastic-material. To effect such a result, it will be obviously necessary to dispose the carriage-guides in a predetermined diagonal position across the bed, and to provide means for withdrawing the saw from its cutting position upon its return stroke. Means are provided, also, for changing the period of the cutting operation, in order to make possible the severing of boards of various lengths. The most generally used plaster-board is twenty-four inches long and thirty-two inches wide, but for some work it is desirable to have a board of other lengths, for instance for some construction-work plaster-boards thirty-six inches long are required.

The invention will be clearly understood by reference to the accompanying drawings, wherein—

Figure 1 is a plan view of the machine; Fig. 2 is a rear elevation, some of the supporting parts being shown in section; Fig. 3 is a front elevation of the machine; Fig. 4 is an elevation of the saw and its carriage, looking from the right end of the same as shown in Fig. 3; Fig. 5 is a rear elevation of the saw-carriage, certain of the parts being shown in section, for clearness; and Figs. 6, 7, and 8 are detail views of suitable means for periodically interrupting the movement of the saw-carriage, when it is desired to cut plaster-boards of lengths other than that for which the machine is designed when the saw-carriage is continuously running.

As illustrated, the machine comprises a suitable bed 1, supported upon longitudinally-disposed beams 2, the bed or floor 1 being preferably composed of a number of strips or slats, over which the web of material to be cut travels in the direction indicated by the arrow in Fig. 1. Mounted on suitable supports 3, one on either side of the machine, are rods or rails 4 and 5 providing a way for the saw-carriage 6. This saw-carriage comprises a block or body-portion 7, carried upon a suitable frame or truck 8 having upper and lower rollers 9, 10, the latter being preferably held to the part of the truck carrying the former yieldingly as by guide-plates 11, pins 12, and connecting coil-springs 13. Mounted on top of the block 7 of the carriage is a plate 14, rigidly connected by means of a rod 15 with a yoke 16 carrying the shaft 17 of the saw 18, the yoke 16, as shown in Fig. 4, being twisted somewhat out of the plane of the block 7, to maintain the plane of the saw at the board for clearance, and finally up to the point of starting a new cut, and the driving means for the saw-carriage and the plaster-board sheet must be so connected up that the latter will travel twenty-four inches while the saw-carriage is making its complete circuit.

Many combinations of figures or values are possible of use in attaining the desired result. Almost any of these may be chosen arbitrarily, and the other values varied accordingly. Suppose it is decided that the saw-carriage shall travel across the plaster-board sheet, in its diagonal direction, while the sheet itself is advanced nine inches. The sheet will advance another nine inches while the saw is making its return or non-cutting stroke. This leaves six inches for the sheet to advance while the saw-carriage moves for clearance outside of the actual cut, that is, beyond the edges of the sheet, before and after cutting, in order to make up the entire twenty-four inches. The angle which the travel of the saw-carriage must make with the line of travel of the plaster-board sheet can be calculated geometrically or trigonometrically, since of a right-angle triangle, two sides, namely, the width of the sheet, usually thirty-two inches, and one leg, nine inches, as above arbitrarily chosen, are known. The hypotenuse, which will be the length of the rails 4 between the vertical planes of the edges of the plaster-board sheet, in such a case will be about thirty-three and one-fourth inches. As will be seen, the carriage must travel thirty-three and one-fourth inches while the plaster-board travels nine inches, or about sixty-six and one-half inches while the plaster-board travels eighteen inches; therefore the carriage must travel between eighty-eight and one-half and eighty-nine inches while the sheet travels the full twenty-four inches. This of course means that with the particular values chosen, the driving-chain must have a length of between eighty-eight and one-half and eighty-nine inches. The result will be that the saw will make a straight cut across the plaster-board sheet, square with the line of travel of the latter, and at intervals of twenty-four inches. Of course, the machine may be "geared up" to cut off boards of other lengths, the particular example being given merely for the purpose of illustration. For some purposes, however, it is desirable to have a machine capable of adjustment so as to cut off plaster-boards having lengths other than the particular one for which it is intended. Obviously, it will, in such case, be necessary to interrupt the travel of the saw-carriage, so that the plaster-board web will have a chance to move the full distance required, say thirty-six inches, before a new cut is made by the saw. The present invention contemplates this, and a suitable means for obtaining this result is illustrated in Figs. 6 to 8. Here, pulley 45, which is regulatably driven by the belt 46', is loosely mounted upon the shaft 47' upon which is fixedly mounted one of the sprockets carrying the chain 42. To the outer end of one of the spokes 48' of the pulley 45' is pivoted an arm 49' having on its free end a laterally-extending pin or stud 50'. This free end of the arm 49' is yieldingly maintained against the inner face of the pulley 45' by means of a plate-spring 51'. Secured upon the sprocket-wheel shaft 47', is an arm or dog 56, having at its outer end an inwardly-projecting lug 57 adapted to engage the stud 50', when the pulley 45' is rotated. It will be seen that only when the pin 50' engages the lug 57 of the arm 56 will the shaft 47', its sprocket-wheel, and therefore the carriage-driving chain, be moved, and if the carriage is to be continuously moved, as in cutting off twenty-four inch lengths, as above described, the pin 50' is constantly in engagement with and rotates the dog 56. In order to move the stud 50' inward, that is away from the lug 57, so that the shaft 47' and therefore the sprocket-wheel will not rotate for certain periods, the following mechanism may be utilized.

Mounted on the cross-beam 41, as shown in Figs. 7 and 8, is an inverted yoke 58, providing at its upper end bearings for a rock-shaft 59. This rock-shaft is provided at its inner end, that is, its end nearer the driving-chain, with an arm 60, adapted to be struck once during each cycle of the movement of the saw-carriage, by a pin 61 secured to the arm 44', or to any moving part of the saw-carriage or its driving chain. On the rear end of the rock-shaft 59 is fixed a somewhat similar arm 62, provided at its near end with a stud or short shaft 63 adapted to rotatably support a star-wheel 64. This star-wheel is provided with a number of shallow pockets 65 and one relatively deep pocket 66, each of these being adapted to accommodate the pin 50' of the arm 49'. When the stud 61 is out of engagement with the arm 40, as is the case when the saw is cutting or being returned, the star-wheel 64 by its own weight falls into its inoperative position, vertically beneath its pivotal point on shaft 59, and remains in this position until stud 61 has returned after a complete cycle of the movement of the saw-carriage and, striking against the arm 60, turns the latter in to the position indicated in Fig. 7, thus moving the star-wheel 64 into its operative position. When the star-wheel is thus swung upward, the pin 50' is received by one of the shallow pockets 65, but the latter being too shallow to enable the pin 50' to keep its normal position against the rim of the pulley 45', the pin 50' is moved inward so far that it does not strike the lug 57 of the dog 56, and therefore the dog 56, the shaft 47', and the sprocket-wheel to which the latter is attached, do not rotate. The stud 61 will therefore maintain its position in engagement with the arm 60, and the star-wheel 64 will still be maintained in its operative position. When the belt 46' which runs continuously has driven the pulley 45' another complete revolution, the pin 50' will drop into another shallow pocket but will, as before, be moved inward so that it will still not strike the lug 57 of the dog 56. This happens successively for each shallow pocket 65, of which there may be several, depending upon the number of turns it is necessary for the pulley 45' to make in order to sufficiently interrupt the movement of the saw-carriage to insure that the plaster-board sheet advances the full distance required, before the saw makes another cut. When the pin 50' falls into the deep pocket 66, however, the pin is permitted to remain in its position against the inner face of the rim of the pulley 45' and can therefore strike the lug 57 of the dog 56. The shaft 47', the sprocket-wheel attached thereto, and the driving-chain will therefore be rotated, the saw-carriage will proceed to make another trip, and the star-wheel 64 will drop into its inoperative position to remain there until the stud 61 on the arm 44' again returns and moves the arm 60 of the rock-shaft 59 into the position shown in Fig. 7. As the pin 50' moves out of the deep pocket 66, the star-wheel 64 is automatically turned through a sufficient angle to make sure that the pin 50' will fall into one of the shallow pockets 65 when the star-wheel is again moved by the stud 61 into its operative position. If necessary, the star-wheel may be maintained in its inoperative position by a spring or the like. Other means may of course be adopted for periodically interrupting the movement of the saw-carriage, to enable the plaster-board sheet to advance the additional distance before the saw makes a new cut, the one shown and described being given merely by way of illustration.

I claim:—

1. In a sawing-machine for severing plaster-boards from a continuously moving sheet, a stationary saw-carriage way diagonally mounted over said sheet, a saw-carriage on said way, means for moving said saw-carriage back and forth over said way, and means for respectively lowering and raising the saw before and after making a cut.

2. In a sawing-machine for severing plaster-boards from a sheet, a stationary saw-carriage way diagonally mounted over said sheet, means for reciprocating the saw-carriage along said way, and means for advancing the plaster-board sheet and saw-carriage at such rate as to produce a series of straight transverse cuts across the sheet at regular intervals.

3. In a sawing-machine for severing plaster-boards from a sheet, a stationary saw-carriage way diagonally mounted over said sheet, means for reciprocating the saw-carriage along said way, means for advancing the plaster-board sheet and saw-carriage at such rate as to produce a series of straight transverse cuts across the sheet at regular intervals, and means for respectively lowering and raising the saw before and after making a cut.

4. In a sawing-machine for severing plaster-boards from a sheet, a stationary saw-carriage way diagonally mounted over said sheet, means for reciprocating the saw-carriage along said way, means for advancing the plaster-board sheet and saw-carriage at such rate as to produce a series of straight transverse cuts across the sheet at regular intervals, and means operated by said reciprocating means for respectively lowering and raising the saw before and after making a cut.

5. In a sawing machine for severing plaster-boards from a sheet, a stationary saw-carriage way diagonally mounted over said sheet, chain-and-sprocket mechanism for reciprocating the saw-carriage along said way, means for advancing the plaster-board sheet and saw-carriage at such rate as to produce a series of straight transverse cuts across the sheet at regular intervals, and means controlled by the travel of the chain over said sprockets for respectively lowering and raising the saw before and after making the cut.

6. In a sawing-machine for severing plaster-boards from a sheet, a saw-carriage way diagonally mounted over said sheet, means for reciprocating the saw-carriage along said way, means for advancing the plaster-board sheet and saw-carriage at such rate as to produce a series of straight transverse cuts across the sheet at regular intervals, a movable support for the saw, and means controlled by said carriage-reciprocating means and connecting with said movable support for respectively lowering and raising the saw before and after making a cut.

7. In a cut-off sawing-machine for severing plaster-boards from a sheet, a saw-carriage way diagonally mounted over said sheet, means for reciprocating the saw-carriage along said way, means for advancing the plaster-board sheet and saw-carriage at such rate as to produce a series of straight transverse cuts across the sheet at regular intervals, a movable support for the saw, a rock-shaft extending transversely of said saw-carriage, means for lowering and raising said saw-support as the shaft is rocked, and means controlled by the saw-carriage reciprocating-means for operating said rock-shaft and respectively lowering and raising the saw before and after making a cut.

8. In a sawing-machine for severing plaster-boards from a sheet, a saw-carriage way diagonally mounted over said sheet, means for reciprocating the saw-carriage along said way, means for advancing the plaster-board sheet and saw-carriage at such rate as to produce a series of straight transverse cuts across the sheet at regular intervals, a movable saw-support, a block forming the body-portion of said carriage through which said saw-support is adapted to move, a plate above said block to which said saw-support is secured, a rock-shaft extending transversely of and having its bearing in said block, connections between the inner end of said rock-shaft and said plate whereby said plate and said saw-support are raised and lowered as said rock-shaft is turned, and means connected to the outer end of said rock-shaft and controlled by said saw-carriage reciprocating-means for rocking the shaft and thereby respectively lowering and raising the saw before and after making a cut.

9. In a cut-off sawing-machine for severing plaster-boards from a sheet, a saw-carriage way diagonally mounted over said sheet, chain-and-sprocket mechanism for reciprocating the saw carriage along said way, means for advancing the plaster-board sheet at such rate as to produce a series of straight transverse cuts across the sheet at regular intervals, a movable saw-support, a rock-shaft on said saw-carriage connected at one end to said saw-support, and means at the other end of said shaft connected to said chain to turn said rock-shaft as its connection with the chain moves over said sprockets, to respectively lower and raise the saw before and after making a cut.

10. In a cut-off sawing-machine for severing plaster-boards from a sheet, a stationary saw-carriage way diagonally mounted over said sheet, means for reciprocating the saw-carriage along said way, means for advancing the plaster-board sheet and saw-carriage at such rate as to produce a series of straight transverse cuts across the sheet at regular intervals, and means for varying the interval between the cuts.

11. In a cut-off sawing-machine for severing plaster-boards from a sheet, a stationary saw-carriage way diagonally mounted over said sheet, means for reciprocating the saw-carriage along said way, means for advancing the plaster-board sheet and saw-carriage at such rate as to produce a series of straight transverse cuts across the sheet at regular intervals, means for respectively lowering and raising the saw before and after making the cut, and means operated by said saw lowering and raising means for varying the interval between the cuts.

12. In a cut-off sawing-machine for severing plaster-boards from a sheet, a stationary saw-carriage way diagonally mounted over said sheet, means for reciprocating the saw-carriage along said way, means for advancing the plaster-board sheet and saw-carriage at such rate as to produce a series of straight transverse cuts across the sheet at regular intervals, and means for varying the interval between the cuts comprising means for periodically interrupting the movement of the saw-carriage for a predetermined time.

In testimony whereof I affix my signature in presence of two witnesses.

DAVID C. WILLIAMS.

Witnesses:
  A. N. RISTINE,
  H. B. SNYDER.